Figure 1:
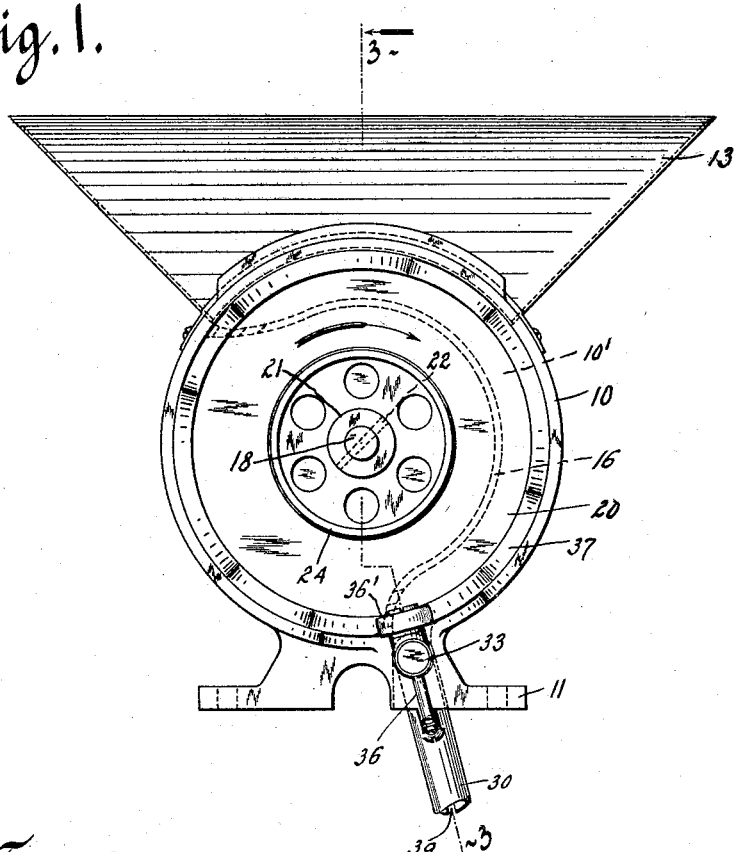

A. BOGDÁNFFY.
FEEDING ATTACHMENT FOR CROWN CORK MAKING MACHINES.
APPLICATION FILED DEC. 13, 1915.

1,200,918.

Patented Oct. 10, 1916.
3 SHEETS—SHEET 1.

WITNESS

INVENTOR
A. Bogdánffy
BY
Sigmund Herzog
his ATTORNEY

A. BOGDÁNFFY.
FEEDING ATTACHMENT FOR CROWN CORK MAKING MACHINES.
APPLICATION FILED DEC. 13, 1915.
1,200,918.
Patented Oct. 10, 1916.
3 SHEETS—SHEET 2.
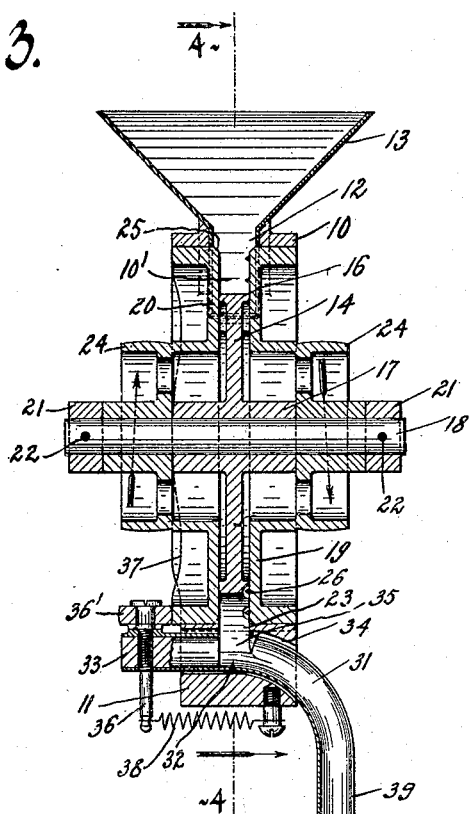
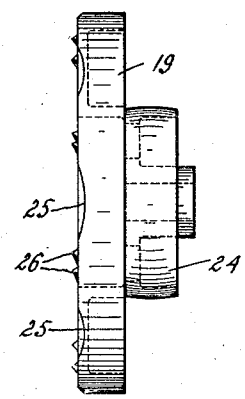
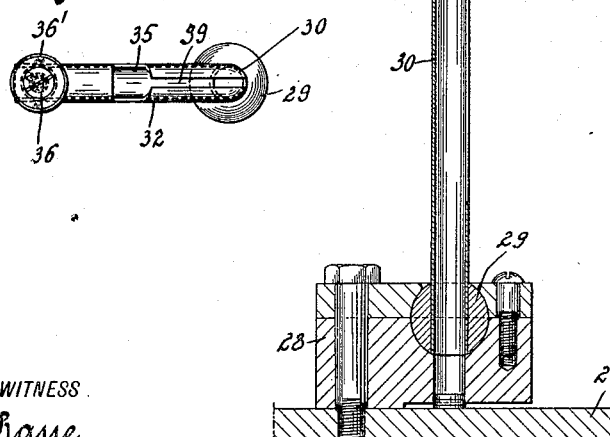
WITNESS
H. Rane.
INVENTOR
A. Bogdánffy
BY
Sigmund Herzog
his ATTORNEY A. BOGDÁNFFY.
FEEDING ATTACHMENT FOR CROWN CORK MAKING MACHINES.
APPLICATION FILED DEC. 13, 1915.
1,200,918.
Patented Oct. 10, 1916.
3 SHEETS—SHEET 3.
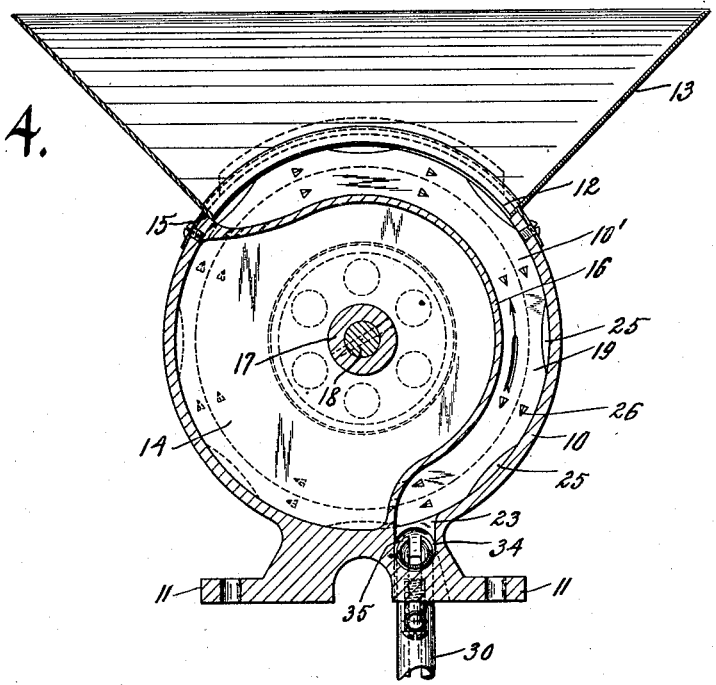
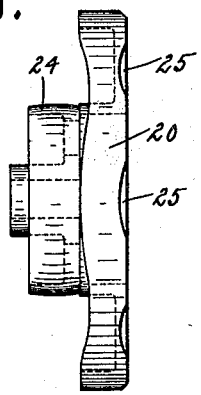
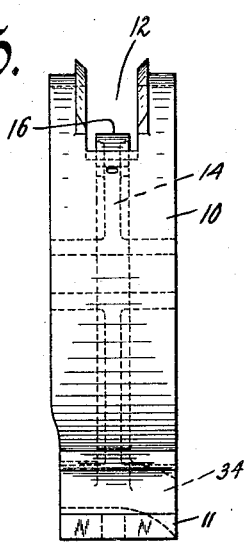
WITNESS
INVENTOR

UNITED STATES PATENT OFFICE.

ALEXANDER BOGDÁNFFY, OF NEW YORK, N. Y.

FEEDING ATTACHMENT FOR CROWN-CORK-MAKING MACHINES.

1,200,918.  Specification of Letters Patent.  Patented Oct. 10, 1916.

Application filed December 13, 1915. Serial No. 66,554.

*To all whom it may concern:*

Be it known that I, ALEXANDER BOGDÁNFFY, a subject of the King of Hungary, and a resident of the city of New York, in the county of Kings and State of New York, have invented certain new and useful Improvements in Feeding Attachments for Crown-Cork-Making Machines, of which the following is a specification.

The present invention relates to machines for manufacturing bottle-, jar-, can- and the like closures of the cap variety, including those termed "crown corks."

More particularly the invention pertains to means for feeding the sealing disks of cork or similar material of the closures to the assembling devices of the machine.

In feeding sealing disks of cork or the like to cap assembling machines, many difficulties have been experienced owing to the fact that, first, said disks vary in their thicknesses to some extent, second, they are very light in weight, and, third, they are apt to take a curved or bent shape when being prepared or treated before they are put upon the assembling machine. In these machines a mass of sealing disks is placed into a hopper, wherefrom they are fed usually through a chute into a tube, that leads to the transporting means which conveys the sealing disks, one after the other, to the assembling elements of the cap making machines. While it is comparatively easy to cause the disks to pass from the hopper proper into the chute above-mentioned, it has been found almost impossible to pass them from the chute into and stack them properly in the tube leading to the transporting means of the assembling machine. The troubles arise in this last named operation mainly due to the fact that the sealing disks are very light in weight, and the difficulties which are experienced within the hopper proper are ordinarily due to the varying thicknesses and shapes of said disks.

The main object of the present invention is to provide a simple and efficient attachment for cap manufacturing machines, which automatically delivers the sealing disks from a mass to an assembling machine without regard to their thickness, weight and more or less curved shapes.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 2:
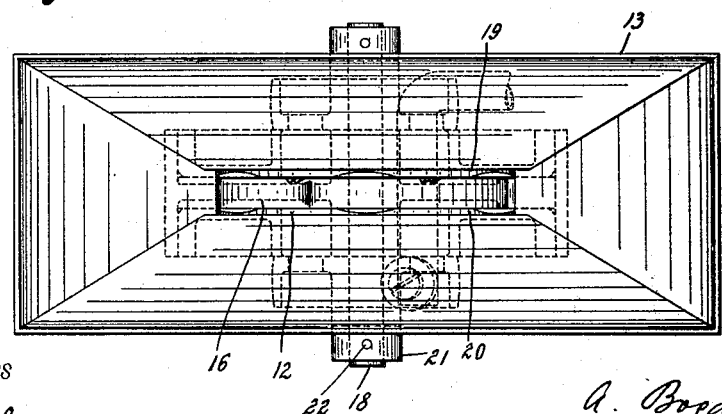

Figure 1 is a side elevation of a feeding attachment constructed in accordance with the present invention; Fig. 2 is a plan view thereof; Fig. 3 is a section taken on line 3—3 of Fig. 1; Fig. 4 is a section taken on line 4—4 of Fig. 3; Fig. 5 is a front elevation of the main frame of the apparatus; Fig. 6 is a side elevation of one of the heads of said main frame; Fig. 7 is a side elevation of another head of said main frame; and Fig. 8 is a plan view of the top end of the tube leading from the hopper to the transporting means of the assembling machine.

In the drawings, the numeral 10 indicates a cylindrical casing, provided with legs 11. This casing is mounted upon a support in a plane a substantial distance above the table of the assembling machine. The longitudinal axis of this casing extends horizontally. In the top of the casing is provided a slot 12, communicating with the outlet of a hopper 13, the latter being held upon the casing in any suitable manner. Within the casing is formed a stationary transverse partition 14, which extends from the edge 15 of the slot 12 to a distance about 125° on the inner cylindrical face of the casing. Through the remainder of the circle, to-wit: about 225°, the partition runs in substantially parallel relation to the remainder of the cylindrical inner face of the casing, but at a distance from the latter which is somewhat greater than the diameter of a sealing disk. Throughout its free edge this partition is provided with a rim 16, the width of which corresponds to the combined thickness of a plurality of sealing disks, say for instance three or four. The width of the rim is somewhat narrower than the slot 12. With the partition is made integral a bearing 17, that is disposed in the longitudinal axis of said casing, and serves to hold a stationary shaft 18, the axis of which coincides with that of the casing. The casing is closed by two disk-shaped heads 19 and 20, which are rotatably mounted upon the shaft 18, and held thereon by stop rings 21, the latter being kept in position upon the shaft in any suitable manner, for instance by pins 22, that extend through said rings and shaft. These heads abut against the rim 16 and thereby form, with the rim and part of the wall of the casing, an arc-shaped passage or chute 10', the inlet of which is constituted by the slot 12 and the outlet of which, denoted by the numeral 23, is disposed at or near the bottom of said casing. With each of the disks is made, preferably, integral a driving pulley 24, to be actuated by belts from any suitable source of power. In the peripheral portions of those faces of the rings which are juxtaposed to the rim 16 there are formed notches 25 for a purpose hereinafter to be described. Upon the inner face of the head 19 are disposed projections 26, said projections being located near the peripheral portion of said head and rotate thus within the passage 10'.

The table of the assembling machine is shown at 27. Upon this table is mounted a bearing 28, adapted to receive the lower spherical end 29 of a tube 30, that leads from the casing 10 to the transporting means, which conveys the sealing disks, one after the other, to the assembling machine. The transporting means, not forming part of this invention, is not disclosed herein. The upper end of this tube is curved, as shown at 31, merging into a substantially horizontal portion 32, that is closed, for instance, by a stopper 33. This stopper may, of course, either be made integral with or may be attached to the tube in any suitable manner. The free end of the tube extends through a longitudinal aperture 34 in the casing, and is provided in front of the stopper 33 with a receiving opening 35, the latter being adapted to be brought into alinement with the outlet 23 of the passage 10'. The free end of the tube is slidably disposed in the aperture 34, the whole tube being oscillatable about its end 29, for a purpose hereinafter to be described. The means for oscillating the tube may be of any suitable type; in the case illustrated in the drawings it comprises a lug 36, that is screwed into the stopper 33, and carries upon one of its ends an anti-friction roller 36', in engagement with the cam-shaped face 37 of the head 20. The other end of the lug is engaged by one end of a spring 38, the other end of which is attached in any suitable manner to the casing 10. The face 37 of the head 20 comprises a plurality of cams, so that, during one revolution of said head, a plurality of oscillations of the tube takes place. The tube is provided with a longitudinal slot 39, as usual in devices of this type, said slot serving to permit the insertion of a pointed instrument into the tube, for instance for the purpose of straightening eventually wrongly placed disks, etc.

The operation of this device is as follows: The two heads of the device are rotated in opposite directions, more particularly the head 19, that is provided with the projections 26, rotates in a direction opposite to that of the hands of a clock, considering Fig. 4, and the other head clockwise. From this it appears that the side walls of the passage 10' are moving in opposite directions.

A mass of disks is placed indiscriminately into the hopper 13, and rotation imparted to the two heads and thus an oscillating or vibrating motion to the tube 30. The disks near to the outlet of the hopper are constantly kept in motion by the two heads, the smooth head, that is the head 20, tending to bring them within the passage 10' and the other one by its projections 26 to elevate them into the hopper. In this manner some disks which are disposed substantially parallel to the inner faces of the heads are brought within the passage 10', the head 19 preventing a clogging of said passage. Those disks which are within the passage are caused to move, either sliding or rolling, along toward the outlet thereof, and to drop through the receiving opening 35 into the tube 39. This tube, being continuously oscillated or vibrated, causes a proper stacking of the disks therein. No matter in what position they arrive in the tube, they will, by the continuous vibrating motion, be brought before they reach the vertical portion of said tube into substantially horizontal positions, and into exactly horizontal positions as soon as they come to pass into the vertical portion thereof.

It is to be observed that the stroke of the horizontal portion of the tube is smaller than the width of the passage 10' in the casing. For this reason a continuous feeding of the disks is adapted to take place into the tube. This feeding is continuous as long as the transporting means is in operation. Should, however, the transporting means fail to work, due to some trouble of the machine or for other reasons, the two rotating heads will keep the disks within the passage 10' continuously in motion, and hold them ready for delivery into the tube as soon as the transporting means resumes its operation.

It is to be observed that the spring 38 moves the tube in the direction of the arrow shown in Fig. 3 of the drawings, and the anti-friction roller in coöperation with the cam face 37 in the opposite direction. In this manner, should there be any obstruction to the motion of the tube in the direction of said arrow, for instance one or more disks that are located partly within the tube and partly within the passage, the spring will cause a stroke of the tube as far as such obstruction will permit, and the cam will then, in time, cause a motion in the opposite direction, thereby permitting the disks either to be brought into the tube or to be moved out therefrom by a projection 26 upon the inner face of the head 19.

The notches 25 are formed in the peripheral portions of the inner faces of the heads to cause a movement of such disks which slide onto the cylindrical faces thereof. They will also cause such disks, which come transversely of the slot 12 onto the said heads, to be turned into parallel relation to the inner faces of these heads.

What I claim is:—

1. In a device of the character described, the combination with a hopper adapted to receive a mass of sealing disks of cork or the like having a discharge opening, of a chute communicating with said discharge opening, and a curved tube having a receiving opening near its upper horizontally disposed end in alinement with the outlet of said chute, and means for oscillating said tube, whereby its horizontal portion reciprocates in relation to said outlet.

2. In a device of the character described, the combination with a hopper adapted to receive a mass of sealing disks of cork or the like having a discharge opening, of a chute communicating with said discharge opening, an oscillating tube having a receiving opening in alinement with the outlet of said chute, and means comprising members moving in opposite directions for keeping the disks in said chute continuously in motion.

3. In a device of the character described, the combination with a hopper adapted to receive a mass of sealing disks of cork or the like having a discharge opening, of a chute communicating with said discharge opening, an oscillating tube having a receiving opening in alinement with the outlet of said chute, and means comprising members rotating in opposite directions for keeping the disks in said chute continuously in motion.

4. In a device of the character described, the combination with a hopper adapted to receive a mass of sealing disks of cork or the like having a discharge opening, of a chute communicating with said discharge opening, and a curved tube having a receiving opening near its upper horizontally disposed end in alinement with the outlet of said chute, and means for oscillating said tube about its lower end, whereby its horizontal portion reciprocates in relation to said outlet.

5. In a device of the character described, the combination with a passage for sealing disks of cork or the like, of a tube having a receiving opening in alinement therewith, and means for oscillating said tube about its lower end.

6. In a device of the character described, the combination with a hopper adapted to receive a mass of sealing disks of cork or the like having a discharge opening, of a casing having an arc-shaped passage in communication with said discharge opening, said passage being bounded by sides moving constantly in opposite directions.

7. In a device of the character described, the combination with a hopper adapted to receive a mass of sealing disks of cork or the like having a discharge opening, of a casing having an arc-shaped passage in communication with said discharge opening, said passage being bounded by sides rotating constantly in opposite directions.

8. In a device of the character described, the combination with a hopper adapted to receive a mass of sealing disks of cork or the like having a discharge opening, of a casing having an arc-shaped passage in communication with said discharge opening, said passage being bounded by sides moving constantly in opposite directions, and projections upon one of said sides.

9. In a device of the character described, the combination with a hopper adapted to receive a mass of sealing disks of cork or the like having a discharge opening, of a casing having an arc-shaped passage in communication with said discharge opening, said passage being bounded by sides rotating constantly in opposite directions, and projections upon one of said sides.

10. In a device of the character described, the combination with a hopper adapted to receive a mass of sealing disks of cork or the like having a discharge opening, of a casing having a partition provided with an arc-shaped edge that is spaced from the inner face of said casing a distance somewhat larger than the diameter of a sealing disk, and two heads closing said casing and abutting against said edge, whereby an arc-shaped passage is formed that communicates with the discharge opening in said hopper.

11. In a device of the character described, the combination with a hopper adapted to receive a mass of sealing disks of cork or the like having a discharge opening, of a casing having a partition provided with an arc-shaped edge that is spaced from the inner face of said casing a distance somewhat larger than the diameter of a sealing disk, and two heads closing said casing and abutting against said edge, whereby an arc-shaped passage is formed that communicates with the discharge opening in said hopper, said heads being constantly rotated.

12. In a device of the character described, the combination with a hopper adapted to receive a mass of sealing disks of cork or the like having a discharge opening, of a casing having a partition provided with an arc-shaped edge that is spaced from the inner face of said casing a distance somewhat larger than the diameter of a sealing disk, and two heads closing said casing and abutting against said edge, whereby an arc-shaped passage is formed that communicates with the discharge opening in said hopper, said heads being constantly rotated in opposite directions.

13. In a device of the character described, the combination with a chute adapted to receive sealing disks of cork or the like, of a tube having a receiving opening in alinement with the outlet of said chute, and means for oscillating said tube, said means comprising a cam for moving said tube in one direction and a spring for moving it in the opposite direction.

14. In a device of the character described, the combination with a chute adapted to receive sealing disks of cork or the like, of a tube having a receiving opening in alinement with the outlet of said chute, and means for oscillating said tube, said means comprising a mechanism for moving said tube positively in one direction and a resilient means for moving it in the opposite direction.

15. In a device of the character described, the combination with a hopper adapted to receive a mass of sealing disks of cork or the like having a discharge opening, of a casing having an arc-shaped passage in communication with said discharge opening, said passage being bounded by sides moving constantly in opposite directions, one of said sides having a roughened surface.

Signed at New York, in the county of New York, and State of New York this 11th day of Dec., A. D. 1915.

ALEXANDER BOGDÁNFFY.

Copies of this patent may be obtained for five cents each, by addressing the "Commissioner of Patents, Washington, D. C."